US007782509B2

(12) United States Patent
Walter et al.

(10) Patent No.: US 7,782,509 B2
(45) Date of Patent: Aug. 24, 2010

(54) SECURITY DEVICE

(75) Inventors: Harald Walter, Kilchberg (CH); Marc Schnieper, Onex-Genéve (CH); Alexander Stuck, Wettingen (CH)

(73) Assignee: CSEM Centre Suisse d'Electronique et de Microtechnique S.A., Neuchatel (CH)

( * ) Notice: Subject to any disclaimer, the term of this patent is extended or adjusted under 35 U.S.C. 154(b) by 449 days.

(21) Appl. No.: 11/576,806

(22) PCT Filed: Sep. 29, 2005

(86) PCT No.: PCT/IB2005/003223

§ 371 (c)(1), (2), (4) Date: Apr. 5, 2007

(87) PCT Pub. No.: WO2006/038120

PCT Pub. Date: Apr. 13, 2006

(65) Prior Publication Data

US 2007/0263285 A1 Nov. 15, 2007

(30) Foreign Application Priority Data

Oct. 7, 2004 (GB) ................................ 0422266.7

(51) Int. Cl.
*G03H 1/00* (2006.01)

(52) U.S. Cl. ........................................................ 359/2

(58) Field of Classification Search ..................... 359/2, 359/562, 566, 567, 568, 586, 587, 589
See application file for complete search history.

(56) References Cited

U.S. PATENT DOCUMENTS 4,426,130 A 1/1984 Knop
4,484,797 A 11/1984 Knop et al.
4,705,356 A 11/1987 Berning et al.
6,324,004 B1 11/2001 Staub et al.
6,473,165 B1 10/2002 Coombs et al.
6,906,861 B2 6/2005 Tompkin et al.
6,927,885 B2 8/2005 Staub et al.
6,943,952 B2 9/2005 Souparis
7,102,823 B2 9/2006 Schilling et al.
7,241,537 B2 7/2007 Kaule
2001/0013975 A1 8/2001 Nakai
2002/0044351 A1 4/2002 Nilsen (Continued)

FOREIGN PATENT DOCUMENTS

DE 103 08 305 9/2004

(Continued)

OTHER PUBLICATIONS

Gale, M.T. "Zero-Order Grating Microstructures," *Optical Document Security*, pp. 267-287.

(Continued)

*Primary Examiner*—Alessandro Amari
(74) *Attorney, Agent, or Firm*—Fish & Richardson P.C.

(57) ABSTRACT

A security device comprises first zero order diffractive microstructure (1) on a substrate, a second zero order diffractive microstructure (2), and an intermediate light transmissive layer (4) separating the two diffractive microstructures. The spacing ($s_{n,n+1}$) between the first (1) and second (2) diffractive microstructures is small enough so that optical interferences are produced between the diffractive microstructures. A further light transmissive layer (3) covers the second diffractive microstructure (2).

12 Claims, 8 Drawing Sheets

U.S. PATENT DOCUMENTS

| | | | |
|---|---|---|---|
| 2003/0058491 A1 | 3/2003 | Holmes et al. | |
| 2005/0170259 A1* | 8/2005 | Holmes | 430/1 |
| 2005/0257270 A1 | 11/2005 | Grassl et al. | |

FOREIGN PATENT DOCUMENTS

| | | |
|---|---|---|
| DE | 103 08 327 | 9/2004 |
| DE | 103 08 328 | 9/2004 |
| FR | 2 838 202 | 10/2003 |
| JP | 08-161449 | 6/1996 |
| WO | 02/37145 | 5/2002 |
| WO | 03/027952 | 4/2003 |
| WO | 03/059643 | 7/2003 |
| WO | 03/082598 | 10/2003 |
| WO | 2004/034338 | 4/2004 |

OTHER PUBLICATIONS

Müller-Buschbaum, P., et al., "Correlated Roughness, Long-Range Correlations, and Dewetting of Thin Polymer Films," *Macromolecules*, 31(11):3686-3692, (1998).

Tibuleac, S., et al., "Reflection and Transmission Guided-Mode Resonance Filters," *J. Opt. Soc. Am. A*, 14(7):1617-1626, Jul. 1997.

Tsutsui, T., et al., "Doubling Coupling-Out Efficiency in Organic Light-Emitting Devices Using a Thin Silica Aerogel Layer," *Advanced Materials*, 13(15):1149-1152, Aug. 2001.

Zimmermann, L., et al., "High refractive index films of polymer nanocomposites," *J. Mater. Res.*, 8(7):1742-1748, Jul. 1993.

Curt, Denis, Substantive Examiner, European Patent Office, EP Application No. 05793751.8, in Communication pursuant to Article 94(3) EPC, mailed Mar. 11, 2008, 5 pages.

* cited by examiner

SECURITY DEVICE

This invention relates to security devices.

Particularly, but not exclusively, the invention relates to security devices using optical filters based on zero-order diffractive microstructures for use as security devices in the fields of authentication, identification and security. In more detail, it is related to the production of zero-order diffractive microstructures having special colour effects—e.g. colour change upon tilting and/or rotation—for use as security devices in a variety of applications like (but not restricted to) banknotes, credit cards, passports, tickets, document security, anti-counterfeiting, brand protection and the like.

It is state of the art to use diffractive optically variable image devices (DOVIDs) like holograms for anti-counterfeiting of banknotes or credit cards. Further magnetic codes or fluorescent dyes are often used to prove the originality of items. Unfortunately counterfeiters have already produced forged versions having high quality of devices using all those techniques. Especially DOVIDs possess only a low level of security, as non-experts generally do not know what the holographic image looks like. Therefore there is a need for novel security devices that are more difficult to counterfeit.

OVIs, as disclosed in the U.S. Pat. No. 4,705,356, provide higher level of security, as it is easier for non-experts to observe a colour change than a complex image. Although OVI's are also difficult to manufacture, and therefore seem to be secure, their effect can be closely mimicked with colour-shifting inks used for decorative purposes that are commercially available from several companies (e.g. http://www.colorshift.com). This decreases the value of OVIs as anti-counterfeiting tool.

In the U.S. Pat. No. 4,484,797 colour filter with zero-order microstructures are described for use as authenticating devices. Illuminated even with non-polarized, polychromatic light such devices show unique colour effects upon rotation and therefore can be clearly identified. Due to the fact that the filters consist of only one grating they possess weak colour effects. Further the possibilities for varying the colour effect are limited (see M. T. Gale "Zero-Order Grating Microstructures" in R. L. van Renesse, Optical Document Security, $2^{nd}$ Ed., pp. 277).

The WO 03/059643 also describes very similar zero-order diffractive gratings for use in security elements. Again only one grating is used. The elements have the same drawbacks as the filters in the U.S. Pat. No. 4,484,797.

An object of the present invention is to mitigate at least some of these drawbacks of the state of the art.

The invention provides a security device and a method of producing such security devices as defined in the appended independent claims, to which reference should now be made. Preferred, advantageous or alternative features of the invention are set out in dependent claims.

In a first aspect the present invention provides security devices and methods for producing such devices that are more forgery-resistant. Such devices comprise at least two zero-order diffractive microstructures one upon another, which together produce novel colour effects that are distinctly different from common colour effects. Even non-experts can therefore easily identify such security devices. At the same time these security devices should be very difficult to duplicate.

In a second aspect the invention provides forgery-resistant devices having intense and therefore easily recognised colour effects.

In a third aspect the present invention provides such forgery-resistant devices having characteristic colour effects that can be measured easily and clearly identified even with low-cost handheld devices as e.g. described in WO 2004/034338 or inter alia in U.S. Pat. No. 6,473,165.

In a fourth aspect the invention provides methods of mass-producing such forgery-resistant devices at low cost using various replication techniques.

The devices can be in the form of hot or cold transferable labels, adhesive tags, direct paper, and the like. They distinctly decrease the possibility of counterfeiting compared to state of the art security devices possessing security printing techniques, optically variable devices (OVDs) like optically variable inks (OVI) or diffractive optically variable image devices (DOVIDs), UV/IR fluorescent dyes, magnetic stripes etc.

Zero-order diffractive microstructures, particularly gratings, illuminated by polychromatic light are capable of separating zero diffraction order output light from higher diffraction order output light. Such structures, for example, consist of parallel lines of a material with relatively high index of refraction n surrounded by (or at least in one half space adjacent to) a material with lower index of refraction. The material above and below the microstructure can have a different index of refraction. All materials have to be transparent (which means transmission T>50%, preferably T>90%) at least in a part of the visible spectral range. The spacing between the lines should be in the range of 100 nm to 900 nm, typically between 200 nm to 500 nm (sub wavelength structure). These microstructures possess characteristic reflection and transmission spectra depending on the viewing angle and the orientation of the structure with respect to the observer (see M. T. Gale "Zero-Order Grating Microstructures" in R. L. van Renesse, Optical Document Security, $2^{nd}$ Ed., pp. 267-287). Other parameters influencing the colour effect are, for example, the period $\Lambda$, the grating depth t, the fill factor f (see FIG. 1) and the shape of the microstructure (rectangular, sinusoidal, or more complex). Furthermore, the grating lines can be connected or vertically or horizontally disconnected (see FIG. 2). In reflection, diffractive microstructures operate as coloured mirrors, in which the colour of the mirror varies with the viewing angle. As long as the materials used show no absorption the transmission spectra are the complement of those in reflection.

A characteristic feature of such structures is a colour change upon rotation by 90°. Supposing a non normal viewing angle, for example 30°, and grating lines parallel to the plane containing the surface normal and the viewing direction, one reflection peak can be measured which splits symmetrically into two peaks upon rotation. A well-known example of such a 90° rotation effect is a red to green colour change (one peak moves from the red to the green part of the spectrum the second peak moves from the red part to the invisible infrared part).

By manufacturing two or more such gratings one upon another (multi-gratings) much more complex spectra and colour effects can be obtained. Additional parameters play a role in the effects, for example the thickness $S_{n+1,n}$ of the spacing layer between the gratings n+1 and n, the phase between gratings, differences in the periods $\Lambda_{n+1}$ and $\Lambda_n$, the orientation of the gratings to each other etc. (see FIG. 1). As there are so many parameters determining the colour effect forgers cannot use an easy trial and error approach for duplication. Additionally stacks of interacting zero-order gratings, embedded in for example polymer foil like PET, are extremely difficult to analyse.

One possible configuration consists of two zero-order gratings with slightly different periods separated by a relatively thick spacing layer (s>>1 µm). Due to the large distance between the gratings no interference effect based on the reflection at the two gratings occurs. The upper grating reflects a certain small part of the visible spectrum of the incident light with high efficiency while the transmitted part passes the grating unaffected. The second grating is optimised to reflect a part of the visible spectrum close to the one of the first grating. Both reflected parts of the visible spectrum are recognized by the observer as a broader peak, which leads to a higher intensity of the colour effect (see FIG. 3). Using more than two gratings can further increase the colour intensity.

Coating the rear surface of a security device containing such multi-gratings modifies the colour spectrum additionally. For example, a black coloured rear surface of the security device absorbs all transmitted light and therefore reduces troublesome ambient light. Other colours as well as metallic or dielectric layers or a stack of metallic and/or dielectric layers lead to different effects. Such coatings of the rear surface of the device are suitable for all types of multi-gratings described in this invention.

Multi-gratings with larger difference of the periods can produce mixed colours, e.g. violet if one reflection peak is in the red part of the spectrum and one in the blue part (viewing angle 30° and grating lines parallel to the plane containing the surface normal and the viewing direction). Upon rotation unusual effects occur. In the mentioned example a colour change from violet to green.

Because of additional interference the described colour effects are modified for thin spacing layers ($0<s<1.5$ μm). These interference effects are strongly dependent on the thickness of the spacing layer and appear for all configurations.

Other novel colour effects can be obtained by stacking two gratings with identical periods $\Lambda$ upon each other. Depending on the thickness s of the spacing layer and the phase relation ps between the gratings (see FIG. 4) interference effects of the reflected light enable unusual colour effects. Useful phase shifts are in the range $0 \leqq ps \leqq \Lambda/2$. For example, gratings with periods shifted by $\Lambda/2$ show within a certain range for the thickness s (typically below 500 nm) nearly no peak splitting upon rotation as one of the peaks is suppressed by destructive interference. Thus in principle even green to invisible colour effects can be designed if the peak at shorter wavelength is suppressed.

Another possible configuration possesses gratings with a periodically modulation of the lines in y-direction. Such gratings can be regarded, to a further approximation, as a superposition of one grating in y-direction with a period $\Lambda_2$ that is slightly rotated with respect to the first. The shape of the modulation can be like a meander or saw tooth or more complex (see FIG. 5). Due to the grating structure and the substructure of the grating lines there are two optically active periods. Therefore such gratings are able to reflect a broader part of the spectrum leading to novel and brighter effects.

This is particularly the case when the modulation between successive grating lines is not in phase, thus changing the local modulation significantly. Furthermore, manufacturing tolerances will usually result in variations from perfect periodicity in the superimposed modulation even if there is no intentional shift between the modulation of the lines. This nonperfect periodicity will also result in a broadening of the peaks.

Yet another configuration consists of a superposition of two non-twisted gratings with different periods where the superposition leads to a longitudinal modulation of the observed period (FIG. 6). Such gratings are capable of reflecting a distinctly broader part of the incident light and thus produce brighter effects. For high efficiency the period of the modulation should be at least 20 μm. As the human eye can resolve lines separated by a distance of about 200 μm for monochromatic appearance of the colour effect the maximum period of the modulation should be 200 μm. At larger periods multi-colour effects are obtained.

Yet another possible configuration possesses gratings with non-parallel orientation in more detail gratings with orientation twisted to each other in the x/y-plane. If twisted only slightly such multi-gratings enable, even at identical period and large spacing layer thickness, the reflection of a broader part of the visible spectrum compared to single gratings (see FIG. 7). The shift of the centre of the envelope of the peaks is less than for single gratings.

Larger twisting of the orientations of the gratings lead to more complex effects. For example, if the gratings are twisted by 90° (FIG. 8) the rotation effect is no greater than a rotation of 45°. This produces an unexpected and a very eye catching effect and may be easily recognised even by persons not conversant with these devices.

All configurations of multi-gratings described herein can be combined with other security technologies like OVIs, holograms, fluorescent dyes, micro- or nano-printing and the like.

The above and other features and advantages of the invention will be apparent from the following description, by way of example, of embodiments of the invention with reference to the accompanying drawings, in which:—

FIG. 1 shows a schematic cross-sectional view of a security device according to the invention, FIG. 2 shows schematic views of three alternative grating structures suitable for use in the security device of FIG. 1, FIG. 3 shows diffractive spectra illustrating the effects of two gratings with slightly different periods separated by a thick spacing layer, FIG. 4 shows schematically three double gratings with different phase relationships, FIG. 5 shows in plan view gratings with periodic modulation of their lines, FIG. 6 shows schematically a grating having a modulated period and line width, FIG. 7 shows reflection spectra illustrating the effect of two gratings with non parallel alignment of grating lines, FIG. 8 shows schematically two gratings twisted by 90°, FIG. 9 shows schematically a method of manufacturing a security device according to the invention, FIG. 10 shows schematically two alternative methods of manufacturing a security device according to the invention, and FIG. 11 shows schematically a method of producing multiple diffraction gratings suitable for use in a security device according to the invention.

FIG. 1 is a schematic cross section of a security device according to the invention comprising a multi-grating (cross-sectional view with grating lines in y-direction). In this example only two gratings are shown. Dark regions 1 and 2 denote a higher index of refraction, brighter regions 3, 4, and 5 lower ones. $c_n$ and $c_{n+1}$ are the thickness of the higher index layers 1 and 2, $t_n$ and $t_{n+1}$ the depth of the corresponding grating profiles, $p_n$ and $p_{n+1}$ the thickness of the gratings lines in x-direction, $\Lambda_n$ and $\Lambda_{n+1}$ the grating periods and $s_{n,n+1}$ the spacing between the two gratings. The fill factors for the two gratings are defined as $f_n=p_n/\Lambda_n$ and $f_{n+1}=p_{n+1}/\Lambda_{n+1}$. The top layer 3, separating layer 4, and bottom layer 5 serve to separate the gratings 1 and 2 and protect the surfaces of the gratings from damage by handling on atmospheric conditions.

FIG. 2 shows schematically cross sectional view of three different types of grating structures, connected high index areas 21 (top), vertically separated high index areas 22 (middle) and horizontally separated high index areas 23 (bottom).

FIG. 3 depicts reflection spectra (no measurement) to illustrate the effect of two gratings with slightly different periods separated by a thick spacing layer. Curves 31, 32, and 33 belong to one grating; curves 34, 35, and 36 belong to the other grating. Solid curves 31 and 34 denote the reflection spectra with orientation of the incident light parallel to the grating lines, dashed curves 32, 33, 35, and 36 the reflection spectra with orientation of the incident light perpendicular to the grating lines.

Figure 1:
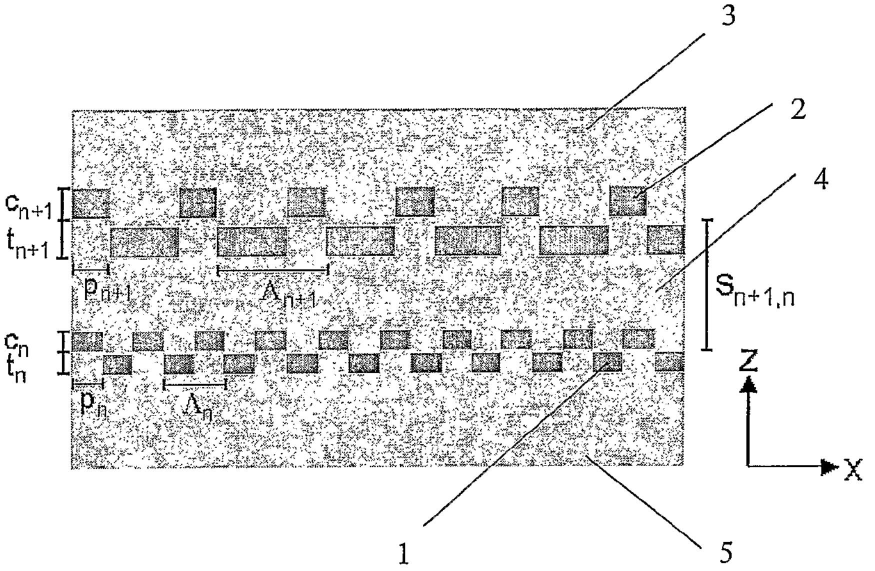
Figure 2:
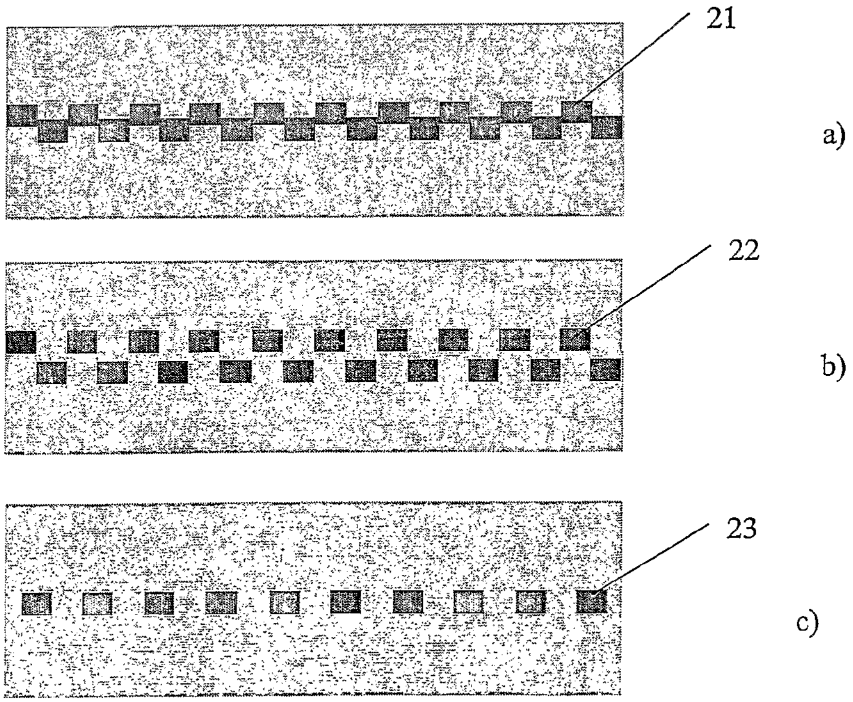
Figure 3:
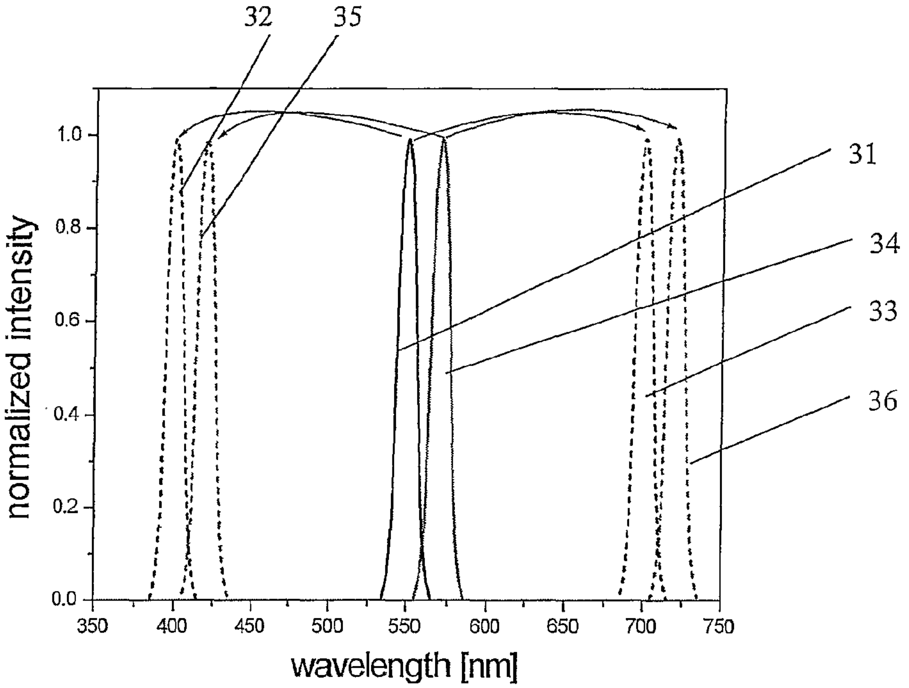
Figure 4:
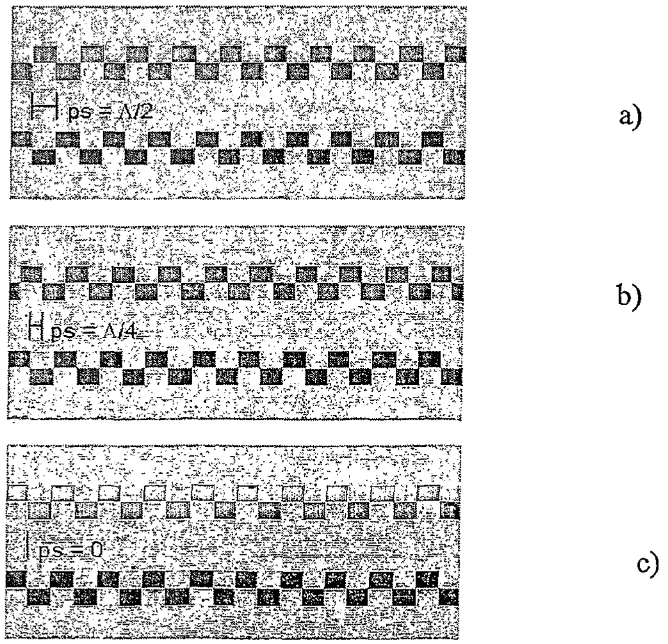
FIG. 4 shows schematically three different types of phase relation ps, $\Lambda/2$ displaced gratings (FIG. 4*a*, top), $\Lambda/4$ displaced gratings (FIG. 4*b*, middle) and no displacement (FIG. 4*c*, bottom).
Figure 5:
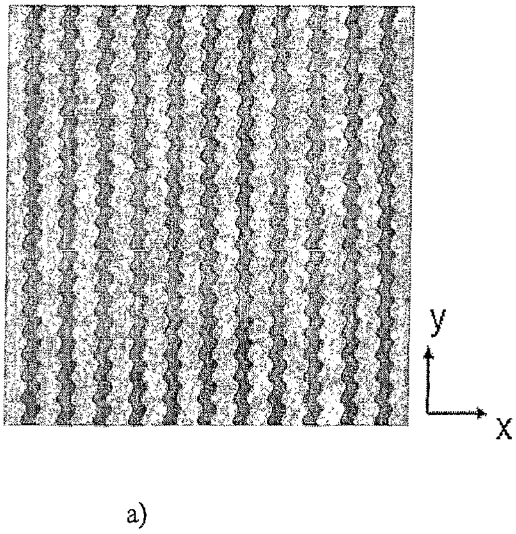
FIG. 5 shows schematically in plan view two different types of periodic modulations of the grating lines, sinusoidal (FIG. 5*a*, left) and saw tooth like (FIG. 5*b*, right).
Figure 5:
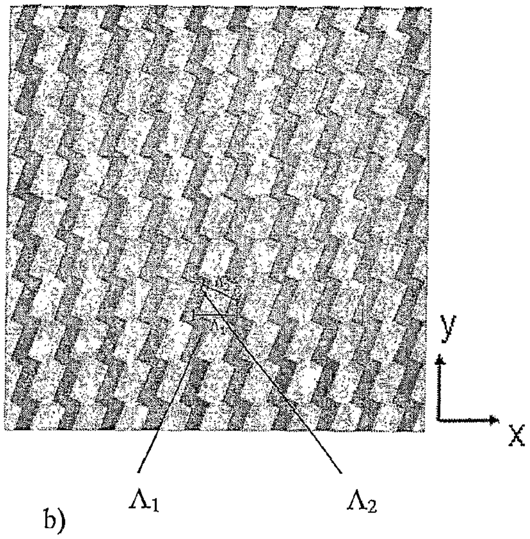
Figure 6:
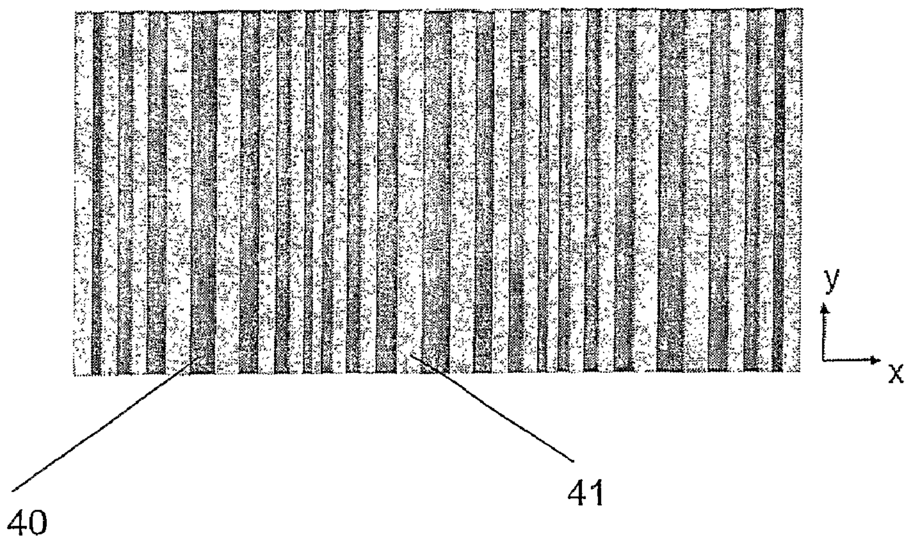

FIG. 6 shows schematically a grating having modulated period, that is the spacing 41 between the lines being varied, and a modulated width of the lines 40. This can alternatively be regarded as two or more regular gratings superimposed in the same plane. Such a modulated grating may be used singly or as one or both of two superimposed spaced apart in the z-axis gratings.

Figure 7:
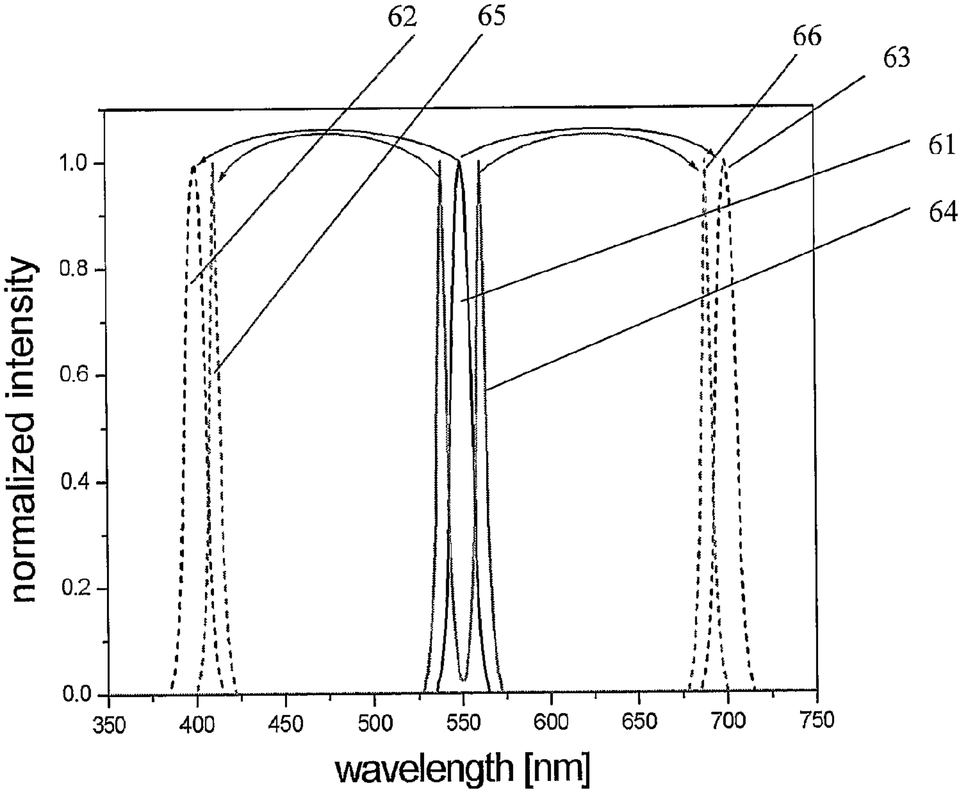

FIG. 7 is a drawing of reflection spectra (no measurement) to illustrate the effect of two gratings with non-parallel orientation. Curve 61 denotes the reflection spectrum with orientation of the incident light parallel to the lines of the grating, the curves 62 and 63 the reflection spectrum with orientation of the incident light perpendicular to the lines of the grating. The curves 64, 65, and 66 belong to the second grating with orientation of the lines slightly rotated in the x/y-plane.

Figure 8:
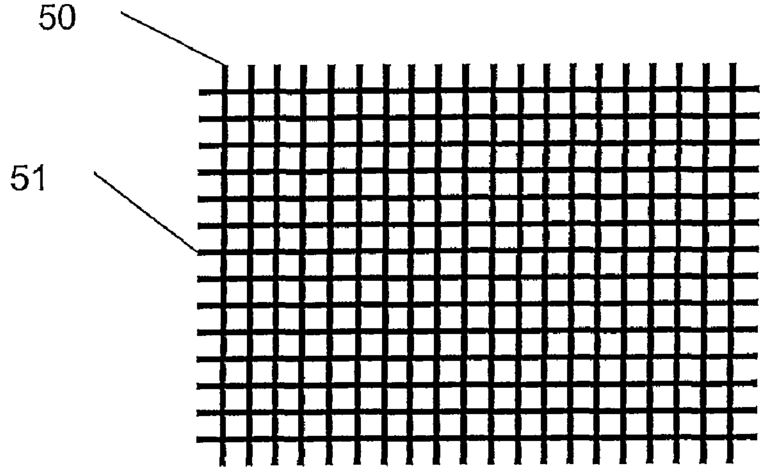

FIG. 8 shows schematically two gratings 50 and 51 where one is rotated by 90° with respect to the other. These gratings may be formed in the same plane or in spaced apart planes. The angle of rotation may be smaller or larger than 90° and more than two rotated gratings may be provided. The gratings may have the same or different periods and the periods may be modulated in length. As with the aligned gratings the lines may be modulated in their longitudinal directions.

Figure 9:
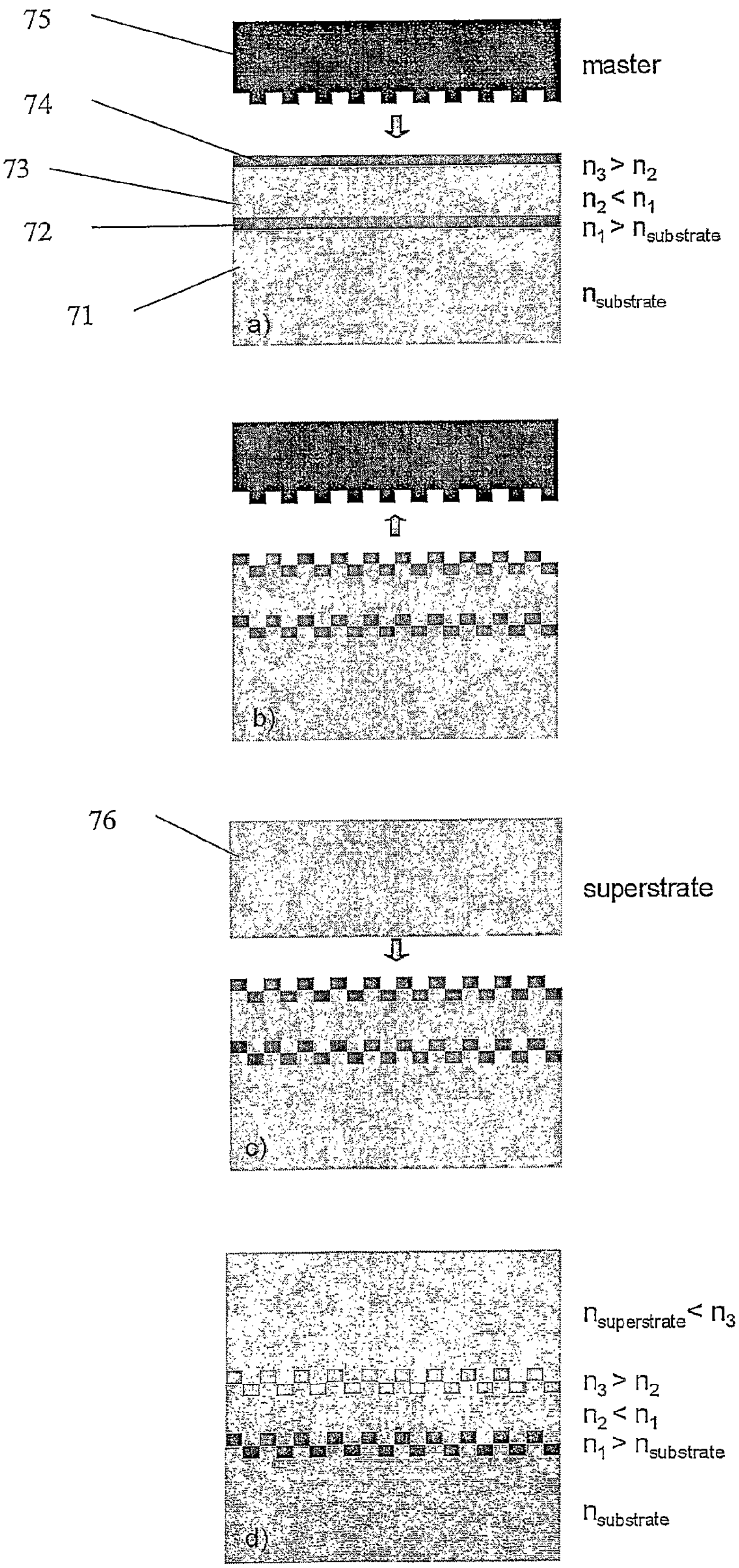

FIG. 9 shows schematically a method of producing a security device according to the invention comprising a double grating with no displacement of the phase relation where the microstructure is embossed in a multilayer stack.

One method for low costs mass production of devices with multi-gratings without phase shift ps is the following (see FIG. 9*a-d*). First on a transparent or opaque substrate 71 with relatively low index of refraction $n_{substrate}$ a first layer with relatively high index of refraction $n_1$ is deposited by vacuum or wet coating and the like. The substrate can be a flexible polymer foil, for example acrylonitrile butadiene styrene ABS, polycarbonate PC, polyethylene PE, polyetherimide PEI, polyetherketone PEK, poly(ethylene naphthalate) PEN, poly(ethylene therephtalate) PET, polyimide PI, poly(methyl methacrylate) PMMA, poly-oxy-methylene POM, mono oriented polypropylene MOPP, polystyrene PS, polyvinyl chloride PVC and the like. Other materials like glass, paper (weight per area 20-500 g/m$^2$, preferably 40-200 g/m$^2$), metal foil, (for example Al—, Au—, Cu—, Fe—, Ni—, Sn—, steel-foil etc., especially surface modified, coated with a lacquer (for example black) or polymer, are suitable too. The index of refraction of the substrate should be in the range of 1.2 up to 1.8, preferably between 1.34 (fluorinated ethylen-propylen-copolymer FEP) and 1.64 (polysulfone PSU), advantageously between 1.49 (PMMA) and 1.59 (PC). All values are for a wavelength of 589 nm. Preferably the substrate is capable of continuous production techniques such as roll-to-roll processes. For such processes the thickness of the substrate 71 is preferably between 5 μm and 200 μm, especially between 12 μm and 50 μm.

The first layer 72 may be formed on the substrate using vacuum coating techniques, for example chemical vapour deposition (CVD—especially PECVD, PICVD, PACVD), thermal or e-beam evaporation, pulsed laser deposition (PLD), sputtering for example DC- or RF-sputtering, etc. Wet coating can be done for example by printing, especially flexo-printing, gravure printing, ink-jet-printing or screen-printing, by curtain or dip coating, by spraying, by sol-gel processes, especially UV or thermal curable sol-gel technique, and the like. Applicable materials for the first layer 72 possess an index of refraction $n_1$ higher than that of the substrate 71. For example, inorganic materials like, but not limited to, AlN, $Al_2O_3$, $HfO_2$, ITO, $Nb_2O_5$, $Si_3N_4$, SnN, $SnO_2$ (pure or doped with F (FTO) or Sb (ATO)), $TiO_2$, $Ta_2O_5$, $V_2O_5$, $WO_3$, ZnO (pure or doped with Al (AZO) or Ga (GZO)), ZnS, or $ZrO_2$ can be used. Possible, but not limited to, organic materials or lacquer containing them are highly brominated vinyl polymer, nitrocellulose NC, PC, PEI, PEN, PET, PI, polyphenylen, polypyrrol, PSU, polythiophen, polyurethane PU. Other possible materials are inorganic/organic compound materials like, but not limited to, ORMOCER™ or mixtures of nano-particle and polymer like, but not limited to, PbS and gelatine. The latter possess indices of refraction up to 2.5 (Zimmermann et. al. J. Mater. Res., Vol. 8, No. 7, 1993, 1742-1748). The thickness of the first layer should be in the range of 20 nm up to 500 nm, preferably between 50 nm and 250 nm.

Next a second layer 73 with index of refraction $n_2<n_1$ is deposited on top of the first layer by one of the methods mentioned above. Suitable inorganic materials include $AlF_3$, $Al_2O_3$, $BaF_2$, $CaF_2$, $MgF_2$, $SiO_2$, $WO_3$. Suitable organic materials or lacquer containing them include FEP, NC, PET, PMMA, PP, PS, polytetrafluorethylen PTFE, PVC. Other possible materials are inorganic/organic compound materials such as mixtures of nano-particles and polymers such as silica aerogel. Such aerogels can possess indices of refraction down to 1.01 (Tsutsui et al, Adv. Mater., Vol 13, No 15, 2001, 1149-1152).

Then a third layer 74 with index of refraction $n_3>n_2$ is deposited on top of the second layer. Again all above-mentioned methods can be used. The material choices and the preferred thickness ranges are the same as for the first layer. For multi-gratings more such layer stacks with high and low index of refraction materials are deposited.

The substrate 71 is microstructured with a single or several gratings either before, in between, or after deposition of the layer stack on the substrate with an adequate mastering tool 75, for example by, but not limited to, cold or hot embossing/stamping as shown in FIG. 9*b*. This may be done in roll-to-roll-process. If appropriate materials and layer thickness are used the microstructure is embossed in both high index of refraction layers 72 and 74.

Finally the structured substrate can be covered 76 with a material that has an index of refraction $n_{superstrate}<n_3$ to protect the microstructure from environmental stress and to hamper attempts to analyse the microstructure. This last layer can be laminated or coated on top of the third layer.

Figure 10:
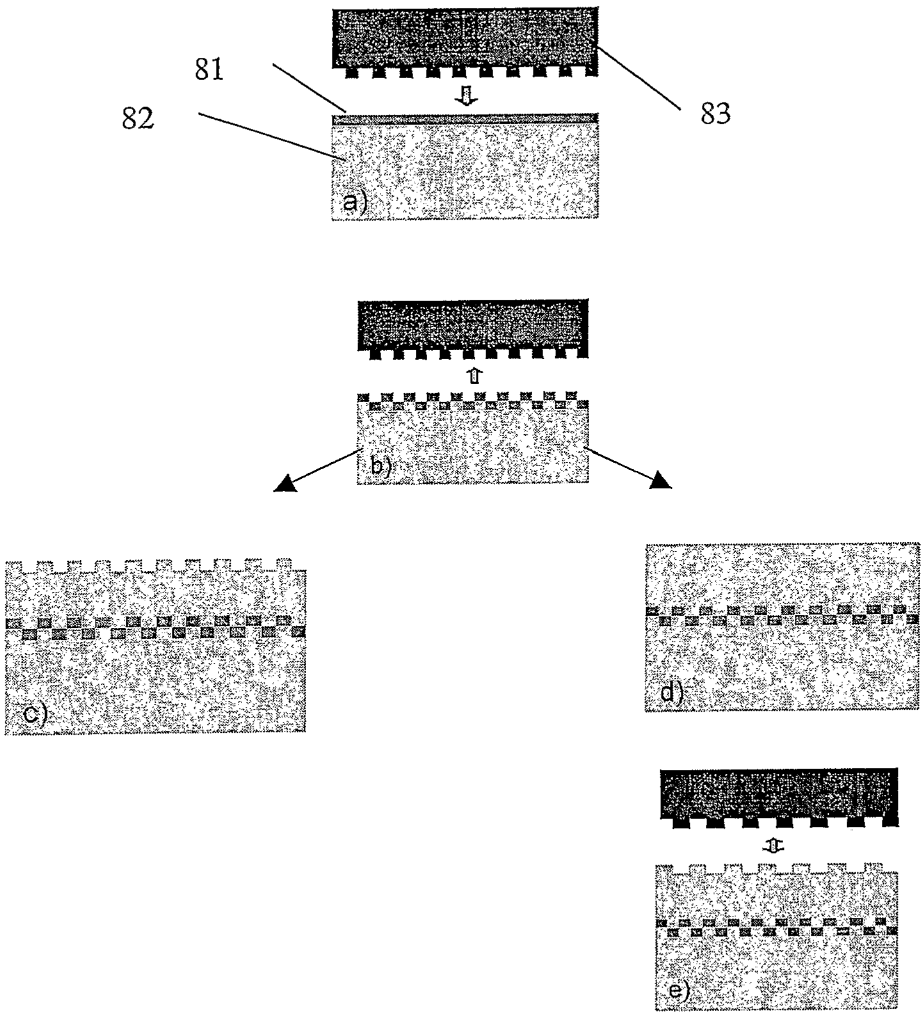

The mentioned materials and techniques are not restricted to this method of low cost mass production. Both are suitable for multi-gratings in general. FIG. 10 illustrates two alternative production methods for double gratings where the microstructure is embossed in the first high index of refraction layer followed by additional coatings. Alternatively, the microstructure can be embossed in the substrate followed by coating with the first layer. The first method FIG. 10*a* and FIG. 10*c* results in a double grating with no displacement of the phase relation. The second one ($a_{)}$-$b_{)}$ and $d_{)}$-$e_{)}$) needs a second embossing step. Therefore the latter enables the production of gratings with different periods and phase relations.

A first layer 81 is deposited on a substrate 82 (see FIG. 10*a*). A stamping or embossing step (FIG. 10*b*) produces a grating. Deposition of the second layer onto such structured substrates can lead to two different results.

On one hand by choosing an appropriate material and layer thickness the surface of the second layer follows the one of the first layer due to the so-called correlated surface structure (Müller-Buschbaum et. al. Macromolecules, Vol. 31, 1998, 3686-3692). Thus both surfaces possess the same microstructure with the same phase relation (see FIG. 10*c*). Coating of the third layer and over covering the final structure with a superstrate can be done in an analogous way to that described above.

On the other hand with other materials and/or thickness for the second layer a smooth surface can be obtained (see FIG. 10*d*). A second micro structuring enables the production of multi-gratings with different periods (see FIG. 10*e*) or phase relation between the gratings etc. Again coating of the third layer and over covering the final structure with a superstrate can be done in an analogous way to that described before.

Figure 11:
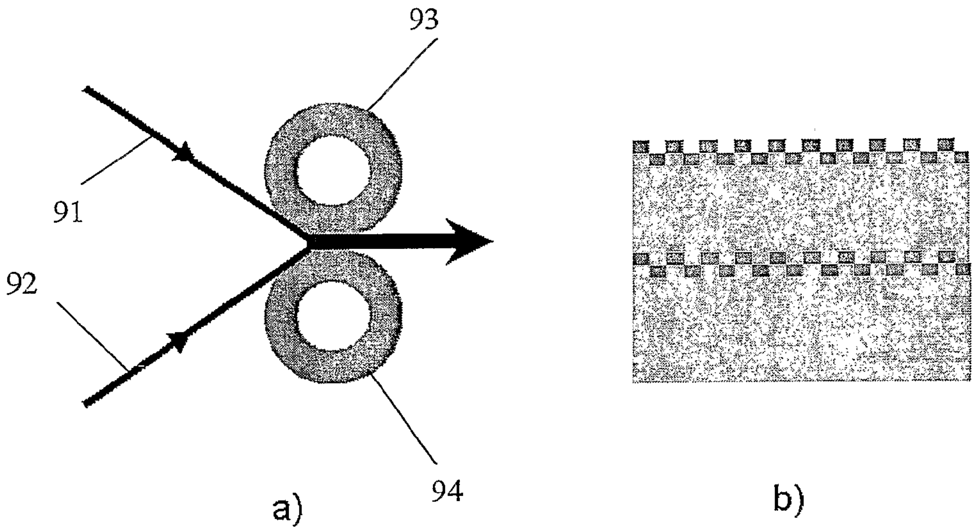

FIG. 11 shows a production method for multi-gratings (here only a double grating is shown) where two web foils 91 and 92 containing a single grating are laminated together between two rollers 93 and 94. The spacing between the gratings is defined by the thickness of the substrate foil.

Clearly further gratings could be produced in a stack by passing more than two foils between the rollers.

The invention claimed is:

1. A security device comprising:

a first zero order diffractive microstructure on a substrate, wherein the first microstructure comprises a high refractive index layer;

a second zero order diffractive microstructure, wherein the second microstructure comprises a high refractive index layer; and an intermediate light transmissive layer separating the first and second diffractive microstructures;

wherein the spacing between the first and second diffractive microstructures is less than 1.5 micrometers (μm) so that optical interferences are produced between the first and second diffractive microstructures.

2. A security device as claimed in claim 1 comprising a further light transmissive layer covering the second diffractive microstructure.

3. A device as claimed in claim 1 comprising one or more further diffractive microstructures and intermediate light transmissive layers arranged above the second diffractive microstructure.

4. A device as claimed in claim 1 in which the lines of each diffractive microstructure are parallel to those of the other diffractive microstructures.

5. A device as claimed in claim 1 in which the lines of two diffractive microstructures arranged in parallel layers in the substrate are rotated with respect to each other.

6. A device as claimed in claim 5 in which the lines are rotated by an angle of 90°.

7. A device as claimed in claim 1 in which the period of at least one of the diffractive microstructures is modulated.

8. A device as claimed in claim 1 in which the diffractive microstructures are substantially identical.

9. A device as claimed in claim 1 in which the diffractive microstructures are aligned.

10. A device as claimed in claim 1 in which the rear surface of the substrate is coated with a light absorbing layer.

11. A security device as claimed in claim 1, wherein the spacing between the first and second diffractive microstructures less than 500 nanometers.

12. A security device as claimed in claim 1, wherein the layers of each of the first and second diffractive microstructures are between 20 nanometer and 500 nanometer thick.

* * * * *